United States Patent
Molisch et al.

(10) Patent No.: US 7,355,959 B2
(45) Date of Patent: Apr. 8, 2008

(54) INTERFERENCE SUPPRESSION FOR OFDM-BASED UWB COMMUNICATION

(75) Inventors: Andreas F. Molisch, Arlington, MA (US); Ye Li, Marietta, GA (US); Jinyun Zhang, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 839 days.

(21) Appl. No.: 10/856,708

(22) Filed: May 28, 2004

(65) Prior Publication Data
US 2005/0265218 A1 Dec. 1, 2005

(51) Int. Cl.
*H04J 11/00* (2006.01)
(52) U.S. Cl. .................. 370/208; 370/343; 370/480; 375/132; 375/346
(58) Field of Classification Search ......... 370/203, 370/208, 343, 344, 480; 375/132, 346
See application file for complete search history.

(56) References Cited

U.S. PATENT DOCUMENTS

| | | | |
|---|---|---|---|
| 6,563,885 B1 * | 5/2003 | Magee et al. | 375/346 |
| 2003/0016770 A1 * | 1/2003 | Trans et al. | 375/346 |
| 2003/0086366 A1 * | 5/2003 | Branlund et al. | 370/208 |

OTHER PUBLICATIONS

J. H. Winters, "Signal acquisition and tracking with adaptive antenna arrays in the digital mobile radio system systems IS-136 with flat fading," *IEEE Trans. on Veh. Technol.*, vol. 42, pp. 377-384, Nov. 1993.

(Continued)

*Primary Examiner*—Ricky Q. Ngo
*Assistant Examiner*—Pao Sinkantarakorn

(74) *Attorney, Agent, or Firm*—Dirk Brinkman; Clifton D. Mueller; Gene V. Vinokur

(57) ABSTRACT

A method suppresses interference in a time-frequency hopped, ultra wide bandwidth system. Signals corresponding to a transmitted symbol are received. The received signals are frequency demodulated, and a coefficient vector w that minimizes a cost function $$C(w_n) = \frac{1}{\sum_k \lambda^{|n-k|}} \sum_k \lambda^{|n-k|} |w_n^H x_k - c_k|^2,$$

is estimated, where $\lambda$ is a weighting factor between 0, x is a vector representing the received signals, H is a frequency response of a channel used to transmit the symbol, and c is a known training symbol. A coefficient vector, $\hat{w}_n = \hat{R}_n^{-1} \hat{d}_n$, is determined, where a correlation matrix for the received signals is $$\hat{R}_n = \frac{1}{\sum_k \lambda^{|n-k|}} \sum_k \lambda^{|n-k|} x_k x_k^H,$$

and an estimate of a crosscorrelation is $$\hat{d}_n = \frac{1}{\sum_k \lambda^{|n-k|}} \sum_k \lambda^{|n-k|} x_k c_k^*.$$

The received signals are then combined according to $$\hat{c}_n = \frac{1}{\sqrt{C(\hat{w}_n)}} \hat{w}_n^H x_n = \frac{1}{\sqrt{1 - \hat{w}_n^H \hat{d}_n}} \hat{w}_n^H x_n.$$

7 Claims, 3 Drawing Sheets

OTHER PUBLICATIONS

Y. (G.) Li and N. R. Sollenberger, "Adaptive antenna arrays for OFDM systems with co-channel interference," *IEEE Transactions on Communications*, vol. 47, pp. 217-229, Feb. 1999.

Y. (G.) Li, L. J. Cimini, Jr., and N. R. Sollenberger, "Robust channel estimation for OFDM systems with rapid dispersive fading channels," *IEEE Trans. on Comm.*, vol. 46, pp. 902-915, Jul. 1998.

A. Batra et al., "Multiband-OFDM physical layer proposal", IEEE P802.15-03/268r2, Nov. 2003.

R. Roberts (Ed.), *IEEE P802.15 Alternate PHY Call For Proposals*, Document IEEE P802.15-02/372r8, 2002.

\* cited by examiner

200

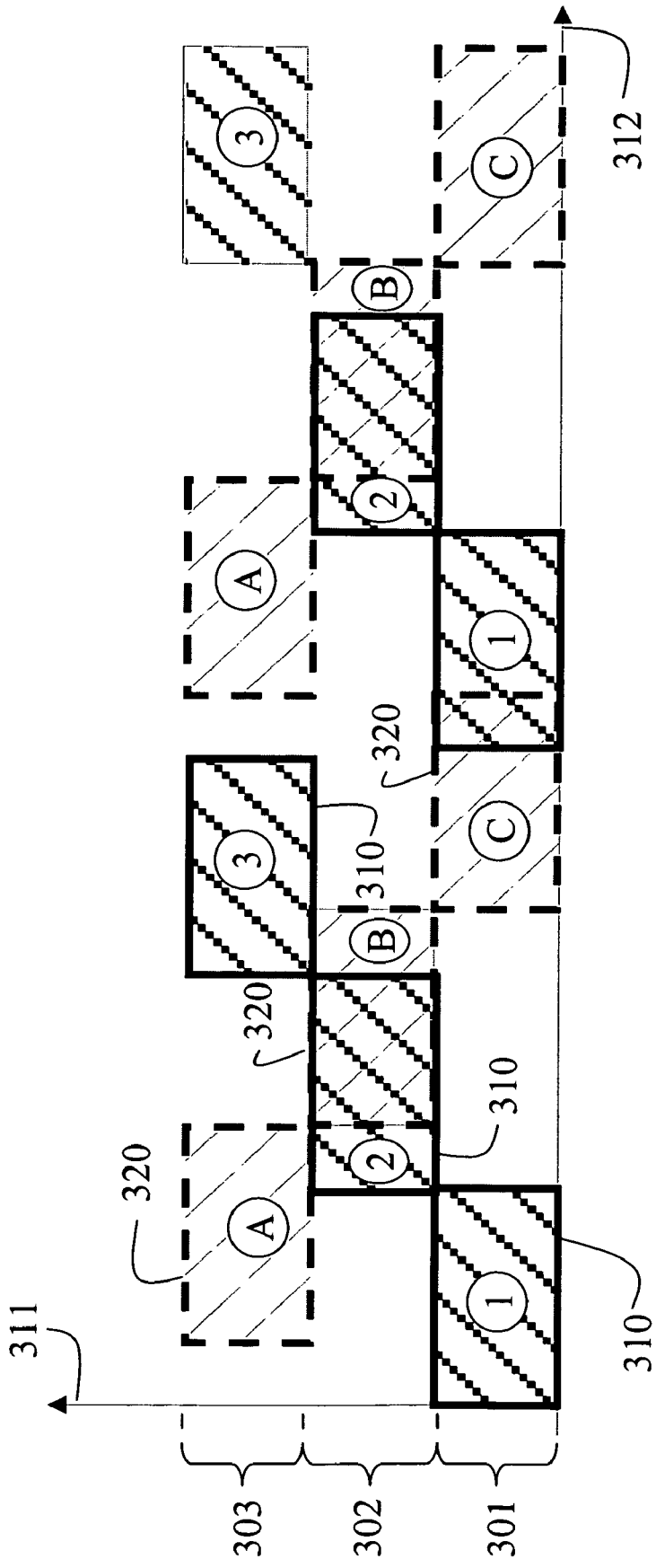

INTERFERENCE SUPPRESSION FOR OFDM-BASED UWB COMMUNICATION

FIELD OF THE INVENTION

This invention relates generally to wireless communication systems, and more particularly to suppression interference in time-frequency hopped, ultra wide bandwidth (UWB) systems.

BACKGROUND OF THE INVENTION

Ultra wide bandwidth (UWB) systems have recently received considerable attention for wireless radio communication systems. The Federal Communications Commission (FCC) has allowed UWB systems for limited indoor and outdoor applications in the U.S.A., Federal Communications Commission, "First report and order 02-48," February 2002.

As one advantage, UWB can transmit data at a high rate over a short range. This makes UWB a promising candidate for personal area networks (PAN) in general, and home networks in particular. Recognizing this potential, the IEEE has formed the 802.15.3a standardization group, whose task is to establish a physical-layer standard for UWB communications with data rates over 100 Mbit/s, R. Roberts (Ed.), *IEEE P802.15 Alternate PHY Call For Proposals*, Document IEEE P802.15-02/372r8, 2002.

The IEEE 802.15.3a standardization group has defined performance requirements for the use of UWB in short range indoor communication system. Throughput of at least 110 Mbps at 10 meters are required. This means that the transmission data rate must be greater. Furthermore, a bit rate of at least 200 Mbps is required at four meters. Scalability to rates in excess of 480 Mbps is desirable, even when the rates can only be achieved at smaller ranges.

A number of possible modulation/multiple access schemes are considered for a physical layer of an ultra wide bandwidth (UWB) communications system by the IEEE 802.15.3a standards working group. One scheme is multiband orthogonal frequency division multiplexing (OFDM) combined with time-frequency interleaving, A. Batra et al., "Multiband-OFDM physical layer proposal", IEEE P802.15-03/268r2, November 2003. It should be noted that the 802.15.3a time-frequency interleaved OFDM scheme has important differences from conventional OFDM as used, e.g., in asynchronized digital subscribe line (ADSL) and IEEE 802.11a wireless LANs.

In practice, OFDM signals are not demodulated by multiple parallel local oscillators for down conversion in an OFDM receiver. Rather, a fast Fourier transform (FFT) of the received signal is equivalent to the signal received on the individual tones. In a practical implementation, the FFT operates on a block of samples of the received signal, e.g., see May et al., "*Orthogonal Frequency Division Multiplexing*," Part IV, Molisch (Ed.), Wideband Wireless Digital Communications, Prentice-Hall, pp. 309-385, 2001. The FFT is typically implemented as a 'butterfly' structure, see, van Nee et al., "*OFDM for Wireless Multimedia Communications*," Artech House, pp. 46-51, January 2000.

It is desired to improve interference suppression for such a modulation scheme because interference suppression can improve the overall performance of the system.

SUMMARY OF THE INVENTION

A method suppresses interference in a time-frequency hopped, ultra wide bandwidth system. Signals corresponding to a transmitted symbol are received. The received signals are frequency demodulated, and a coefficient vector w that minimizes a cost function $$C(w_n) = \frac{1}{\sum_k \lambda^{|n-k|}} \sum_k \lambda^{|n-k|} |w_n^H x_k - c_k|^2,$$

is estimated, where $\lambda$ is a weighting factor between 0, x is a vector representing the received signals, H is a frequency response of a channel used to transmit the symbol, and c is a known training symbol.

A coefficient vector, $\hat{w}_n = \hat{R}_n^{-1} \hat{d}_n$, is determined, where a correlation matrix for the received signals is $$\hat{R}_n = \frac{1}{\sum_k \lambda^{|n-k|}} \sum_k \lambda^{|n-k|} x_k x_k^H,$$

and an estimate of a crosscorrelation is $$\hat{d}_n = \frac{1}{\sum_k \lambda^{|n-k|}} \sum_k \lambda^{|n-k|} x_k c_k^*.$$

The received signals are then combined according to $$\hat{c}_n = \frac{1}{\sqrt{C(\hat{w}_n)}} \hat{w}_n^H x_n = \frac{1}{\sqrt{1 - \hat{w}_n^H \hat{d}_n}} \hat{w}_n^H x_n.$$

BRIEF DESCRIPTION OF THE DRAWINGS

FIG. 3 is a time-frequency representation for time-frequency hopping with interference suppressed according to the invention.

DETAILED DESCRIPTION OF THE PREFERRED EMBODIMENT

Signal Structure

Figure 1:
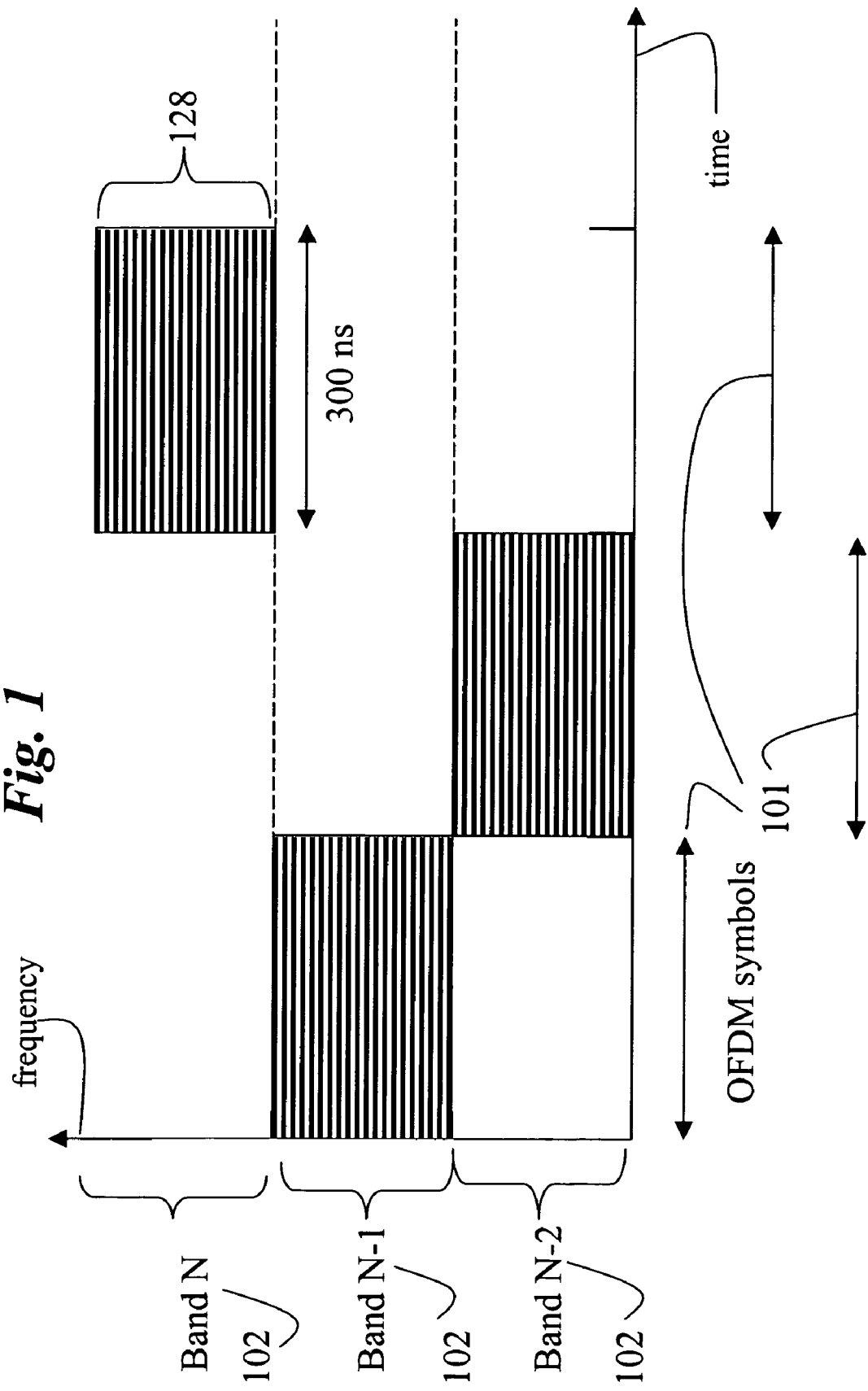
FIG. 1 is a time-frequency representation 100 of a multiband OFDM signal to which interference suppression according to the invention is applied.
Figure 2:
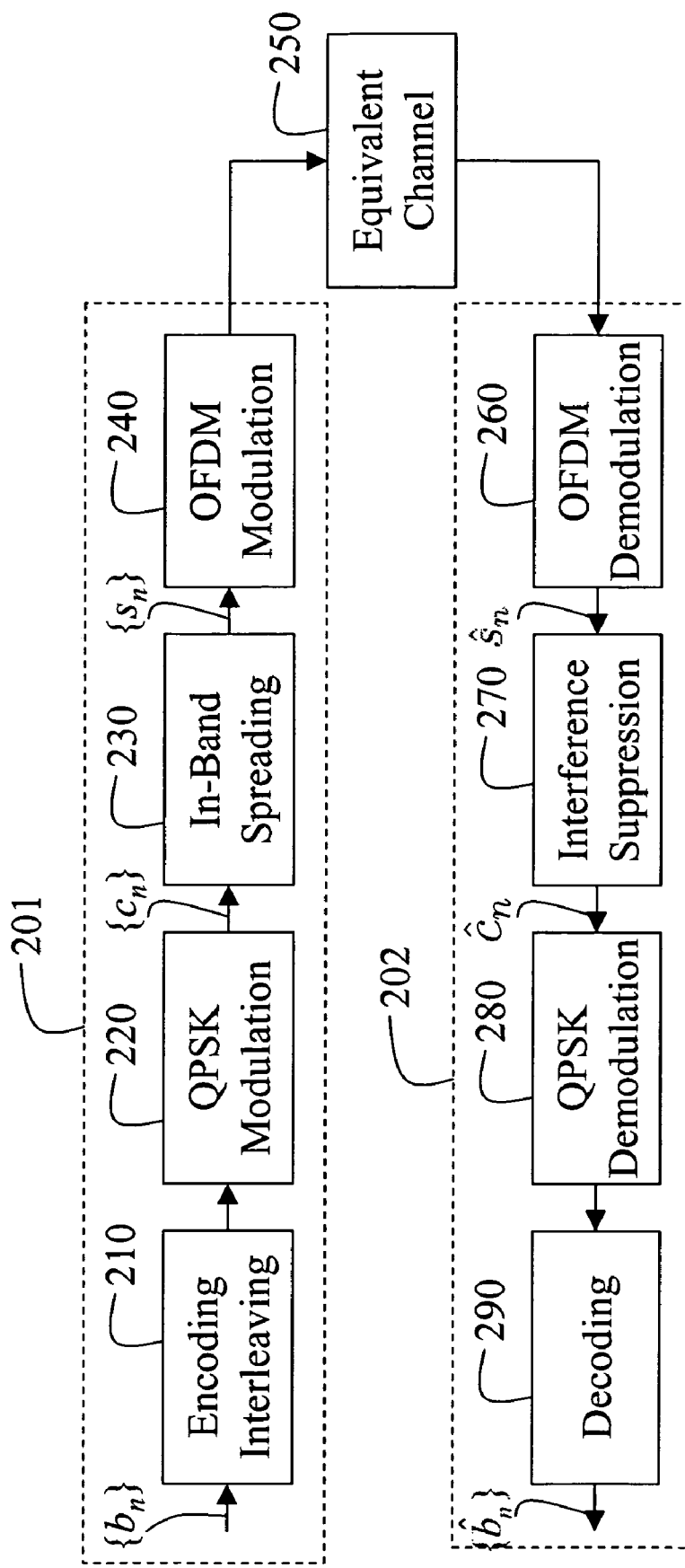
FIG. 2 is a block diagram of an OFDM system according to the invention.

As shown generally in FIG. 1, an OFDM transmitter, see FIG. 2, sends data (OFDM symbols or 'blocks') 101 in parallel on K carrier frequency band ("tones") 102. Note that for multiband OFDM, all of the carrier frequencies are within one band. For example, in one proposal to the IEEE 802.15 standards working group, 128 tones are spaced approximately 4 MHz apart, and have a duration of approximately 300 ns. Each of the tones is quaternary phase shift keying (QPSK) modulated.

System Structure

FIG. 2 shows an orthogonal frequency division multiplexing (OFDM)-based UWB system 200 according to the invention. The system 200 includes a transmitter 201 and a receiver 202. In the transmitter 201, a binary data steam of $\{b_n\}$ to be transmitted is first encoded and interleaved 210. Then, the encoded stream is modulated 220 to complex QPSK symbols $\{c_n\}$.

The interference suppression according to the invention can be used in any OFDM system that can be modeled as $$\begin{pmatrix} x_{1,n} \\ x_{2,n} \\ \vdots \\ x_{L,n} \end{pmatrix}_{x[n]} = \begin{pmatrix} H_{1,n} \\ H_{2,n} \\ \vdots \\ H_{L,n} \end{pmatrix}_{H[n]} c_n + \begin{pmatrix} i_{1,n} \\ i_{2,n} \\ \vdots \\ i_{L,n} \end{pmatrix}_{i_n}, \quad (1)$$

or $$x_n = H_n c_n + i_n, \quad (2)$$

for n=1, 2, . . . , K, where $i_{l,n}$ is interference. The interference statistics corresponding to different n's are correlated.

The interference suppression according to the invention can be used in all systems that can be modeled by Equations (1) or (2). These systems include OFDM-based UWB with in-band spreading, repetition, and receiver antenna arrays.

OFDM-Based UWB with In-Band Spreading

To exploit frequency diversity of UWB channels, the symbols can be spread 230 by a factor of two within the same OFDM block, and then modulated 240. Consequently, the symbols $s_n$ for an OFDM block can be expressed as, $$s_n = \begin{cases} c_n & \text{for } n = 0, 1, \ldots, \frac{N}{2}-1, \\ jc_{n-\frac{N}{2}} & \text{for } n = \frac{N}{2}, \frac{N}{2}+1, \ldots, N-1, \end{cases} \quad (3)$$

where $j = \sqrt{-1}$. Therefore, the corresponding time-domain OFDM signal can be expressed as $$s(t) = \sum_{k=0}^{N-1} s_k e^{j2\pi f_k t},$$

where $f_k = f_o + k\Delta f$, $\Delta f$ is the tone space, which relates to the OFDM symbol duration by $$T = \frac{1}{\Delta f}.$$

This signal is time-frequency interleaved. In other words, the carrier frequency of the local oscillator changes for every transmitted OFDM-symbol, see FIGS. 1 and 3.

For simplicity, this effect is absorbed into a propagation channel 250 when the signal is transmitted. In other words, the channel is periodically time variant.

In the receiver 202, the signal is received from the channel 250. The received signal includes multiple copies of each transmitted OFDM symbol transmitted at different instances in time. The multiple copies can be obtained by different receive antennas.

The received signal is OFDM demodulated 260; interference is suppressed as described below. The signal with suppressed interference is QPSK demodulated 280 before decoding 290.

Due to multipath and interference in the channel 250, the demodulated 260 OFDM signal at the receiver 202 can be expressed as $$\hat{s}_n = H_n s_n + i_n + n_n, \quad (4)$$

where $H_n$ is the frequency response of a UWB channel at the n-th tone for the OFDM symbol under consideration, $i_n$ is interference, and n is additive white Gaussian noise (AWGN) with zero-mean and variance $N_0$.

From Equation (3), Equation (4) can be also expressed as $$\hat{c}_n = \frac{1}{\sqrt{C(\hat{w}_n)}} \hat{w}_n^H x_n \quad (5)$$

$$= \frac{1}{\sqrt{1 - \hat{w}_n^H \hat{d}_n}} \hat{w}_n^H x_n.$$

or $$x_n = H_n c_n + i_n, \quad (6)$$

for n=0, 1, . . . , N/2−1, where $$x_n = \begin{pmatrix} \hat{s}_n \\ \hat{s}_{n+N/2} \end{pmatrix}, \quad H_n = \begin{pmatrix} H[n] \\ jH[n+N/2] \end{pmatrix},$$

$$i_n = \begin{pmatrix} i_n \\ i_{n+N/2} \end{pmatrix} + \begin{pmatrix} n_n \\ n_{n+N/2} \end{pmatrix}.$$

OFDM-Based UWB System with Repetition Diversity

For an OFDM-based UWB system with repetition diversity, the same OFDM block is transmitted at different times and/or frequency bands. As a result, we have $$x_{l,n} = H_{l,n} c_n + i_{l,n}, \quad (7)$$

where $x_{l,n}$, $H_{l,n}$, and $i_{l,n}$ are the received signal, the frequency response of the channel, and interference at the n-th tone of the l-th time and/or frequency repetition, $c_n$ is the transmitted symbols at the n-th tone. It is obvious that the above equation can be written in matrix form as in Equation (1) or (2).

OFDM-Based UWB System with Receive Antenna Arrays

An OFDM based UWB system with receive antenna array can be also described by Equation (1) or (2). In that scenario, $c_n$ is the transmitted symbol at the n-th tone, $x_{l,n}$ in Equation (1) or (2) represents the received signal from the n-th tone of the l-the antenna, $H_{l,k}$ represents the channel's frequency response at the n-th tone of the l-th receive antenna, and $I_{l,n}$ represents interference, including co-channel interference and noise.

Interference Suppression Approach

Some UWB systems, such as those according to the IEEE 802.15.3a standard, have two types of multiple access: for devices within one piconet, TDMA is used, causing no interference. However, different piconets, which can operate in the same area use of different time-frequency interleaving codes, but do not coordinate the timing of the transmission, i.e., they are 'un-cooperative' piconets. Thus, interference is unavoidable.

For an OFDM-based UWB system with in-band symbol spreading, time and/or frequency band repetition, or receive antenna arrays, it is possible to suppress interference if the interferer user is also using the same scheme, J. H. Winters, "Signal acquisition and tracking with adaptive antenna arrays in the digital mobile radio system systems IS-136 with flat fading," *IEEE Trans. on Veh. Technol.*, Vol. 42, pp. 377-384, November 1993. There, an optimum coefficient vector w that minimizes the MSE of the combiner output, $\hat{c}_n = w_n^H x_n$, is determined by $$w_n = R_n^{-1} d_n, \quad (8)$$

where $R_n$ and $d_n$ are defined as $$R_n = E\{x_n x_n^H\}, \text{ and } d_n = E\{x_n c_n^*\},$$

respectively. The coefficient vector $w_n$ for MMSE combining can be calculated using Equation (8) with the received signal correlation matrix, $R_n$, and the vector d is an estimate of crosscorrelation between the transmitted symbol and the received signal vector.

The estimation of the correlation matrix is for flat fading channels. A correlation matrix for OFDM with frequency-selective channels is also known, Y. (G.) Li and N. R. Sollenberger, "Adaptive antenna arrays for OFDM systems with co-channel interference," *IEEE Transactions on Communications*, Vol. 47, pp. 217-229, February 1999.

However, if that technique is applied to OFDM-based UWB systems, then the estimated correlation matrix is sometimes not positive-definite when each of its element is estimated separately.

Therefore, we provide a novel approach for coefficient vector estimation.

Let $\{c_n\}$ be a training symbol. Training symbols are transmitted at regular intervals to achieve channel estimation. Then, a coefficient vector, $w_i$ can be found that minimizes a cost function $$C(w_n) = \frac{1}{\sum_k \lambda^{|n-k|}} \sum_k \lambda^{|n-k|} |w_n^H x_k - c_k|^2,$$

where $\lambda$ is a weighting factor between 0 and 1. The weighting factor puts more emphasis on terms with a small |n−k|. Direct calculation yields the coefficient vector $$\hat{w}_n = \hat{R}_n^{-1} \hat{d}_n,$$

where the received signal correlation matrix is $$\hat{R}_n = \frac{1}{\sum_k \lambda^{|n-k|}} \sum_k \lambda^{|n-k|} x_k x_k^H,$$

and an estimate of crosscorrelation is $$\hat{d}_n = \frac{1}{\sum_k \lambda^{|n-k|}} \sum_k \lambda^{|n-k|} x_k c_k^*.$$

With the estimated coefficient vector, the received signals can be combined by $$\hat{c}_n = \frac{1}{\sqrt{C(\hat{w}_n)}} \hat{w}_n^H x_n \quad (9)$$

$$= \frac{1}{\sqrt{1 - \hat{w}_n^H \hat{d}_n}} \hat{w}_n^H x_n.$$

Performance Comparison

To compare the performance of a maximum ratio (MR) and the minimum mean-square error (MMSE) diversity combiners, we simulate the OFDM-based UWB system 200, according to the model described above. In our simulation, the system 200 uses packet transmission, where each packet contains 8096 ($2^{13}$) bits. A rate-1/3 convolutional code with generator sequences 133, 145, and 171 is used. Consequently, the length of each code word is about 24,300 bits. The coded sequence is then converted into 12150 complex QPSK symbols. Each OFDM block transmits fifty symbols. Therefore, there are 243 OFDM data blocks in each time slot. Another three OFDM blocks, each for one of three subbands, are used for training symbols. Hence, there are totally 246 OFDM blocks. Each consists of 128 tones, 100 of the tones are information tones, 12 of the tones are pilot tones, and the remaining are null tones. That, is no signal is transmitted for peak-to-average power ratio (PAPR) reduction.

The performance of the MR combiner is better than that of the MMSE combiner when there is no interference. When there is no interference, the MR and the MMSE combiners should be equivalent if the exact coefficients for diversity combining are used. Since more accurate coefficients for the MR combiner can be estimated, the MR combiner has better performance than the MMSE combiner. However, when interference appears, the MMSE combiner has very good performance, while the MR combiner does not work.

Random Interference Suppression

FIG. 3 shows time-frequency hopping with interference 300. In FIG. 3, the frequencies 311 are in three bands 301-303, and time is on the horizontal axis 312. The hopping pattern of the desired signal 310 (circled number 1, 2, 3) is band 301, band 302 and band 303, while the hopping pattern of an interfering signal 320 (circled letters A,B,C) is band 303, band 302 and band 301.

From FIG. 3, one can see that there is always one interference-free band for a particular transmitter, and the other two bands have some interference, depending on timing between interferer signal 320 and the desired signal 310.

The power ratio of the particular transmitter to an interfering transmitter is defined to be SIR. Due to time-frequency hopping, the power ratio of the desired user and the effective interference, the overlapped area in FIG. 3, is reduced to $$SIR_e = \frac{1}{3}SIR, \text{ or } SIR_e \text{ (dB)} = SIR - 4.8 \text{ (dB)}.$$

In UWB systems, each slot/package contains about a hundred OFDM blocks. As different piconets, i.e., transmitters with different time-frequency codes, are uncoordinated, the interference situation might change during the transmission of a packet. In this case, we change the coefficients of the MMSE combiner according to interference environments.

According to the "Strawman' proposal, there are 12 pilot tones for each OFDM block, A. Batra et al., "Multiband-OFDM physical layer proposal," IEEE P802.15-03/268r2, November 2003. Those pilot tones are located at fixed frequencies for all transmitted symbols.

However, according to the invention, the pilot tones are rotated through all possible subcarriers in a periodic manner. With this pilot tone scheme, the coefficients for the MMSE combiner can be adaptively estimated and up-dated according to interference environments.

That is, the transmitting pilot tones have a fixed frequency for a particular symbol, but different frequencies for different symbols, such that the different frequencies for the different symbols vary periodically. This way, the frequency response of the channel can also be estimated from the pilot tones.

EFFECT OF THE INVENTION

The invention provides channel estimation and interference suppression for OFDM-based UWB systems. The invention can be used for high data-rate UWB communication networks.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for suppressing interference in a time-frequency hopped, ultra wide bandwidth system, comprising:
   receiving signals corresponding to a transmitted symbol;
   frequency demodulating the received signals;
   estimating a coefficient vector w that minimizes a cost function $$C(w_n) = \frac{1}{\sum_k \lambda^{|n-k|}} \sum_k \lambda^{|n-k|} |w_n^H x_k - c_k|^2,$$

where $\lambda$ is a weighting factor between 0, x is a vector representing the received signals, H is a frequency response of a channel used to transmit the symbol, and c is a known training symbol;
   determining a coefficient vector $\hat{w}_n = \hat{R}_n^{-1} \hat{d}_n$,
where a correlation matrix for the received signals is $$\hat{R}_n = \frac{1}{\sum_k \lambda^{|n-k|}} \sum_k \lambda^{|n-k|} x_k x_k^H,$$

and an estimate of a crosscorrelation is $$\hat{d}_n = \frac{1}{\sum_k \lambda^{|n-k|}} \sum_k \lambda^{|n-k|} x_k c_k^*;$$

and
   combining the received signals according to $$\hat{c}_n = \frac{1}{\sqrt{C(\hat{w}_n)}} \hat{w}_n^H x_n = \frac{1}{\sqrt{1 - \hat{w}_n^H \hat{d}_n}} \hat{w}_n^H x_n.$$

2. The method of claim 1, in which the received signals include multiple copies of the transmitted symbol, the multiple copies being transmitted at different instances in time.

3. The method of claim 1, in which each of the multiple copies of the transmitted symbol is obtained by a different receive antenna.

4. The method of claim 1, further comprising:
   transmitting pilot tones having a fixed frequency for a particular symbol, and different frequencies for different symbols.

5. The method of claim 4, in which the different frequencies for the different symbols vary periodically.

6. The method of claim 4, in which a frequency response of the channel is estimated from the pilot tones.

7. The method of claim 1, further comprising:
   phase shift demodulating the combined signal; and
   decoding the phase shift demodulated signal to recover the transmitted symbol with suppressed interference.

* * * * *